(12) United States Patent
McCaffery et al.

(10) Patent No.: US 12,164,861 B2
(45) Date of Patent: Dec. 10, 2024

(54) SYSTEM, METHOD, AND APPARATUS FOR IDENTIFYING AND PREVIEWING RESPONSES TO QUESTIONS ACROSS DIFFERENT QUESTIONNAIRES

(71) Applicant: ClearOPS, Inc., Scarborough, NY (US)

(72) Inventors: Caroline McCaffery, Scarborough, NY (US); George Rosamond, Brooklyn, NY (US); Aqsa Sheikh, Lawrenceville, NJ (US)

(73) Assignee: ClearOPS, Inc., Scarborough, NY (US)

( * ) Notice: Subject to any disclaimer, the term of this patent is extended or adjusted under 35 U.S.C. 154(b) by 0 days.

(21) Appl. No.: 18/151,180

(22) Filed: Jan. 6, 2023

(65) Prior Publication Data
US 2023/0229854 A1   Jul. 20, 2023

Related U.S. Application Data

(60) Provisional application No. 63/297,080, filed on Jan. 6, 2022.

(51) Int. Cl.
*G06F 40/174* (2020.01)
*G06Q 30/018* (2023.01)

(52) U.S. Cl.
CPC ......... *G06F 40/174* (2020.01); *G06Q 30/018* (2013.01)

(58) Field of Classification Search
CPC ............................ G06F 40/174; G06F 30/018
See application file for complete search history.

(56) References Cited

U.S. PATENT DOCUMENTS

| | | | |
|---|---|---|---|
| 2017/0046622 A1* | 2/2017 | Gaither | G06F 40/247 |
| 2020/0380071 A1* | 12/2020 | Sundar | G06F 40/174 |
| 2023/0161952 A1* | 5/2023 | Garimella | G06N 3/045 |
| | | | 715/224 |

* cited by examiner

*Primary Examiner* — Kyle R Stork
(74) *Attorney, Agent, or Firm* — Leason Ellis LLP

(57) ABSTRACT

An apparatus, computer-implemented method, and a system are disclosed that maintain a knowledge base to pre-populate prospective database inputs, by: receiving one or more database input forms containing database input fields; associating the database input fields to previous database input fields stored in a repository based on a recognition process on corresponding respective word strings and previous word strings corresponding to the previous database input fields; retrieving prior inputs to the previous database input fields based on the associating; formatting the retrieved one or more prior inputs; updating the received one or more database input forms; transmitting the updated database input forms; receiving at least one of a confirmation and an edit; finalizing the updated one or more database input forms; and transmitting the finalized database input forms to one or more source computing apparatuses associated with the one or more database input forms.

20 Claims, 15 Drawing Sheets

```
s401: search for exact matches in question word strings
between questions contained in uploaded questionnaire file
and previous questions stored in information system 120
                          ↓
s405: for any identical question word string matches, write
previous answers stored in information system 120 to
uploaded questionnaire file 400b
                          ↓
s410: for any remaining questions in the uploaded
questionnaire file, execute deep learning semantic similarity
model
                          ↓
s415: for any question word string similarities above
threshold, format and write previous answers stored in
information system 120 to uploaded questionnaire file 400b
                          ↓
s420: record all similarity scores for answers written at step
s415
                          ↓
                        ( end )
```

FIG. 4

SYSTEM, METHOD, AND APPARATUS FOR IDENTIFYING AND PREVIEWING RESPONSES TO QUESTIONS ACROSS DIFFERENT QUESTIONNAIRES

CROSS REFERENCE TO RELATED APPLICATIONS

This application is based on and claims priority to U.S. Provisional Patent Application 63/297,080, filed Jan. 6, 2022, which is incorporated by reference, as if expressly set forth in its entirety herein.

FIELD

The present disclosure generally relates to a computer database input automation system.

BACKGROUND

Companies often use vendors to carry out and manage portions of their business. Vendors, typically suppliers of goods and services, can supply these goods and services locally or remotely via a communications network. For example, companies may use vendors to manage the payroll, human resources, or data storage aspects of its respective business. These management services can be conducted by remotely accessing data of the company and processing such data according to the needs of the company. Off-loading particular aspects of a business to third-party vendors can often result in increased efficiency and profit for the company.

As part of entering into such service agreements, due diligence needs to be conducted among companies and vendors, which can be a time-consuming and expensive process. As an example, such due diligence often includes initial—and sometimes periodic—exchanges of questionnaires that relate to various kinds of compliance. Such questionnaires, including questionnaires provided by companies and organizations seeking to engage outside contractors (e.g., vendors) that provide goods and services in the marketplace, are often custom, long, and complicated, especially when provided by large-scale organizations seeking to ensure that various policies or practices are in place at a respective vendor.

It is recognized herein that there is a need for methods and systems for managing and completing questionnaires accurately and efficiently, using fewer computing resources in less time. Providing timely and accurate responses to complex questionnaires increases the likelihood that a vendor can secure and win a bid, for example, and be engaged for providing goods and services.

What is needed in the art are systems, methods and computer products that manage, complete, and provide responses to questionnaires accurately and efficiently.

BRIEF SUMMARY

An apparatus, computer-implemented method, and a system are disclosed that maintain a knowledge base of database records adapted for pre-populating prospective database inputs. In one or more implementations, at least one computing device is configured by executing code to receive, from another computing device, one or more database input forms containing database input fields corresponding to respective word strings related to an operation associated with the other computing device. In one or more implementations, the one or more database input forms contain respective one or more questionnaires related to the operation of the other computing device and the database input fields correspond to respective responses to questions contained in the questionnaires.

The at least one computing device is further configured to associate the database input fields to previous database input fields stored in a repository. In one or more implementations, a recognition process is used on the respective word strings and previous word strings corresponding to the previous database input fields. In one or more implementations, the recognition process comprises a semantic-based machine learning (ML) model for recognizing similar word strings between the respective word strings and the previous word strings. The associating of the plurality of database input fields to the previous database input fields is used to retrieve one or more prior inputs to the previous database input fields from the repository. In one or more implementations, the retrieved prior inputs correspond to a previous version of the database input forms. In one or more implementations, the retrieved prior inputs correspond to a different database input field from a previous database input form that is different from the received database input forms. The retrieved prior inputs are formatted and written to the database input fields to update the received database input forms. The updated database input forms are then transmitted to the other computing device. In one or more implementations, the updated forms are confirmed or edited at the other computing device. The at least one computing device is further configured to receive the confirmation or edit(s), finalize the database input forms, and transmit the finalized forms to source computing apparatuses associated with the database input forms. In one or more implementations, the at least one computing device is further configured to update the repository based on the received confirmation or edit(s).

These and other aspects, features, and advantages can be appreciated from the accompanying description of certain embodiments of the invention and the accompanying drawing figures and claims.

BRIEF DESCRIPTION OF THE DRAWINGS

Various exemplary embodiments of this disclosure will be described in detail, with reference to the following figures, wherein:

Figure 1A:
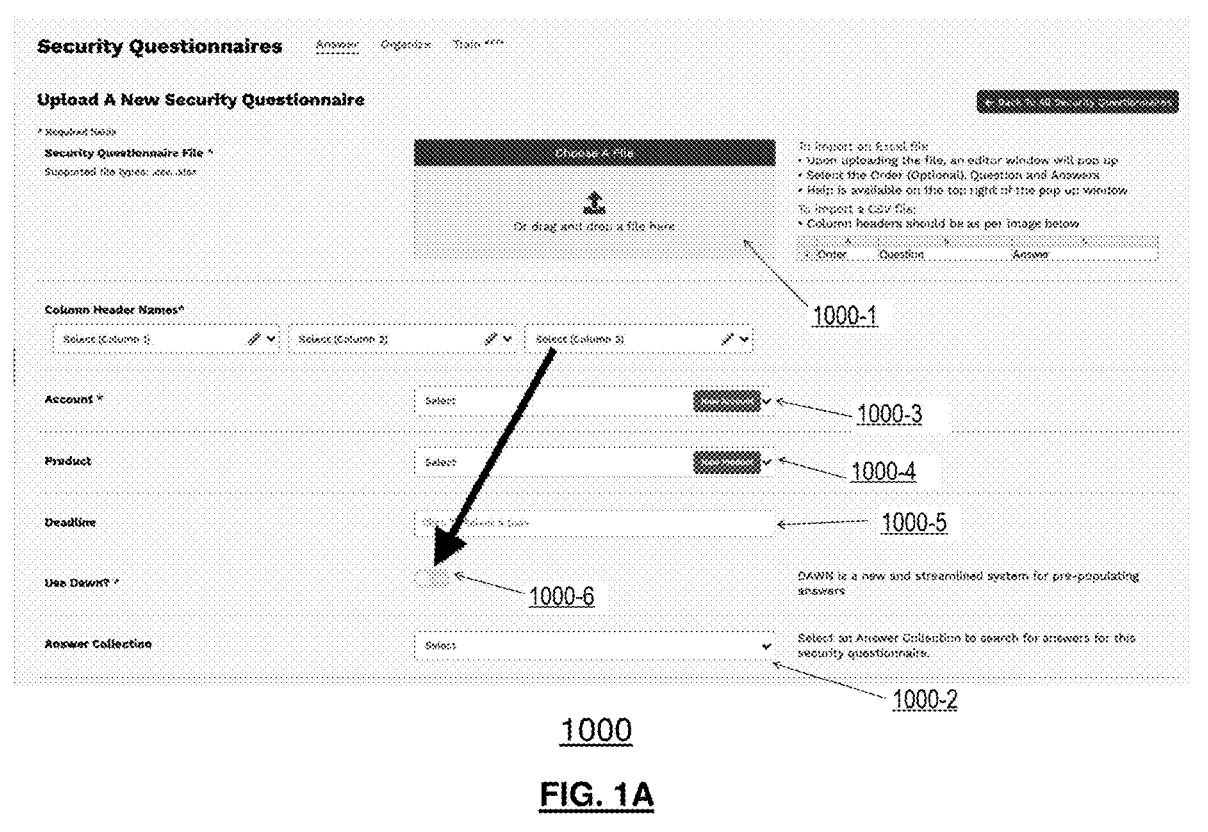
Figure 1B:
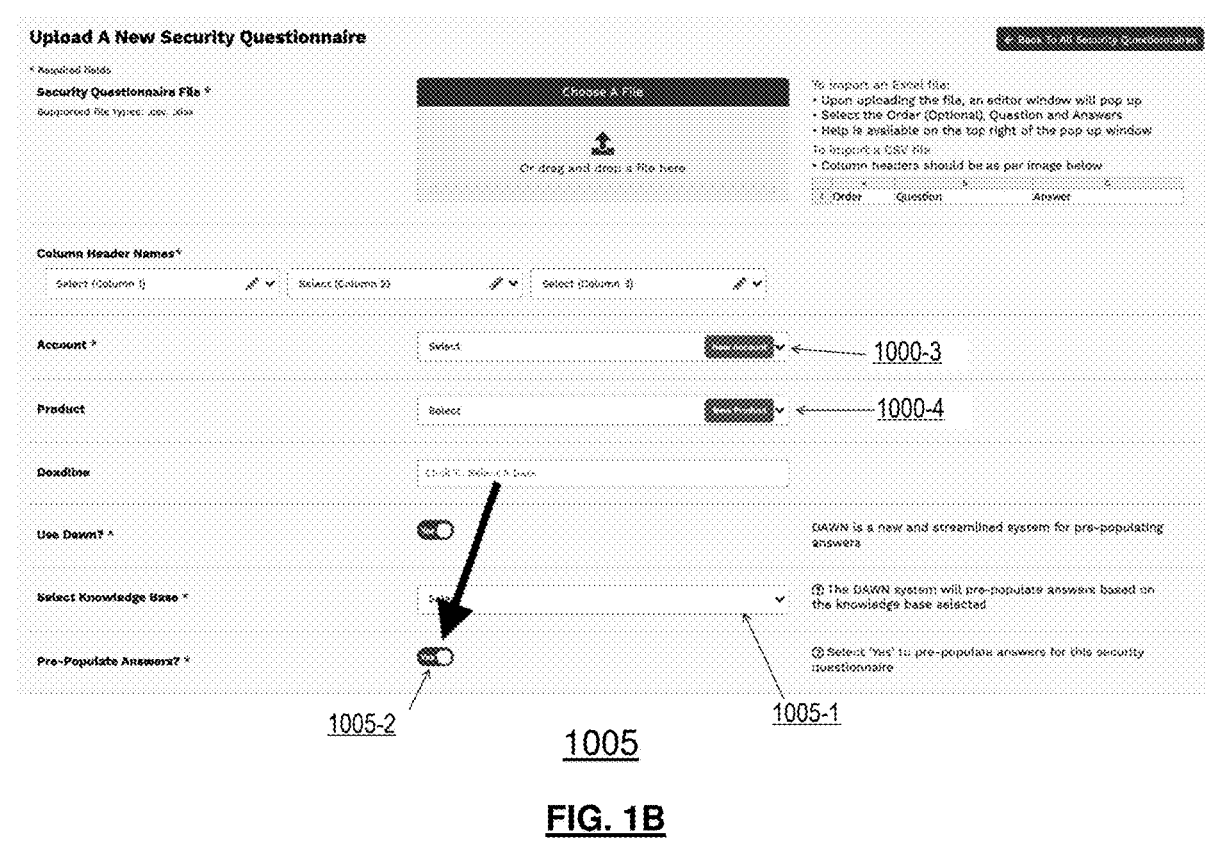

FIGS. 1A-1J are graphical user interfaces according to one or more example implementations of the present disclosure.

FIG. 4 is a flow diagram of a question recognition process according to one or more example implementations of the present disclosure.

DETAILED DESCRIPTION

Figure 1C:
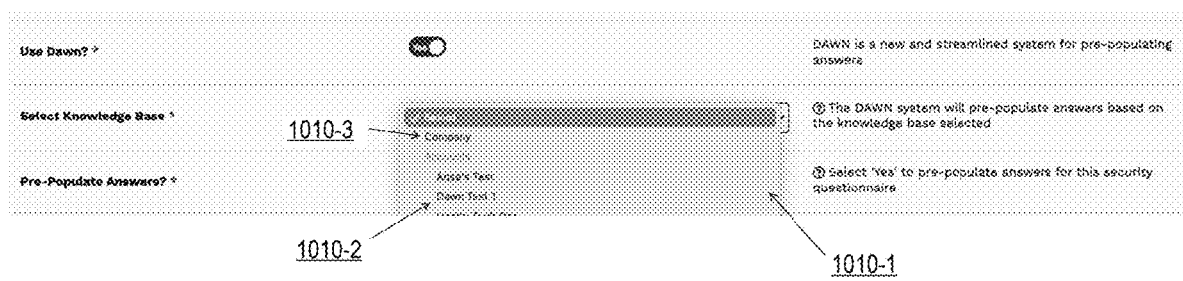

By way of introduction, the present disclosure includes systems and methods associated with knowledge management, including relating to privacy and security operations, and for generating and transmitting information associated with the knowledge management between disparate computing devices. More particularly, the present disclosure automates provisioning of responses to a questionnaire that relates to various kinds of compliance, including questionnaires provided by companies and organizations seeking to engage outside contractors (e.g., vendors) that provide goods and services in the marketplace. Such questionnaires are often custom, long, and complicated, especially when provided by large-scale organizations seeking to ensure that various policies or practices are in place at a respective vendor. Using the systems and methods disclosed herein, questionnaires can be completed accurately, using fewer computing resources, and in a fraction of the time that would otherwise be required of the vendor. Providing timely and accurate responses to complex questionnaires increases the likelihood that a vendor can secure and win a bid, for example, and be engaged for providing goods and services.

After a new questionnaire is received regarding a particular matter of compliance, for example, to identify respective security configurations that are currently in place at a vendor, systems and methods herein are provided for processing the new questionnaire. Such security configurations can involve malware and ransomware protection, network access security, privacy protection, or data security, to name just a few. Other areas of compliance are also supported herein, such as regarding human resources, employment hiring practices, or virtually any business operations of interest to a hiring company or organization. In one or more implementations of the present disclosure, machine-based model(s) can be generated and/or used to identify questions in the knowledgebase that are the same or within an acceptable threshold of similarity as questions set forth in the newly received questionnaire. The model(s) can identify same or similar questions and, thereafter, select corresponding responses that were previously provided and, thereafter, populate the new questionnaire with the responses. As described herein, populating can comprise one or more of associating, storing, adding, retrieving, and storing data related to the responses. One or more graphical user interfaces ("GUIs") can be provided that display the populated responses and corresponding generated or otherwise provided in accordance with the teachings herein. Interactive options can be provided in the GUIs for users to add, edit, approve, reject, make comments or otherwise handle responses, which can be provided to the knowledgebase for future application and use. In this way, the knowledgebase continually evolves, becoming more accurate and applicable as more questionnaires are received and processed.

The present disclosure further provides for contextual handling of questionnaires, including to preclude questions from being populated with responses that may be inaccurate or inappropriate for various reasons. For example, different departments or groups within a vendor's organization may employ different privacy controls, security controls, technical, legal, personnel, or other configurations. Furthermore, a single vendor may have a series of product offerings, each associated with different privacy controls, security controls, technical, legal, personnel, or other configurations. In such cases, it may be inappropriate to submit responses to questions for one particular department or group of a respective product offering that are based on or the same as responses that were previously provided by a different department or product group. The present disclosure improves accuracy by including technical tools to ensure that previous responses from one group or person or product are not improperly provided in questionnaires that are not appropriate for another group or person or product, even for a single vendor or outside contractor.

In one or more example implementations, a GUI is provided that includes graphical tools for a user to define or otherwise associate a questionnaire (and respective responses or response collections) with an account, such as a user, a department, a product, a customer, a standard or other suitable way within an organization, as well as by whole organization (e.g., a company). For example, when a new questionnaire is received and being processed for use in accordance with the teachings herein, a user can select a drop-down list that identifies previously defined accounts or, alternatively, can define a new account, to associate with the questionnaire. Thereafter, responses that have been previously submitted to questionnaires that are associated with one or more accounts can be used to populate a new questionnaire, thereby providing a technique for managing responses associated with specific controls or compliances that are current and in proper context.

Referring now to the drawings, FIG. 1A illustrates a graphical user interface 1000 according to one or more example implementations of the present disclosure, which can be displayed on, for example, a display screen (user interface 315) of one or more of user computing devices 300. Graphical user interface 1000 includes one or more graphical screen controls (e.g., 1000-1) that, when selected, causes one or more instructions to be executed by one or more processors to upload one or more questionnaire files containing multiple questions and may also contain answers, such as a questionnaire regarding information technology privacy and/or security compliance. Once imported, the questions can be indexed and included in the knowledgebase. In one or more example implementations, the uploaded questionnaire files can be in a suitable file format, such as .csv, .xlsx, or other data file format (such as xml). As further illustrated in FIG. 1A, graphical user interface 1000 provides an interface 1000-2 for associating the uploaded questionnaire file(s) with a response knowledge base, which can be grouped for an account (e.g., user, customer, standard or department account) 1000-3 and/or a product offering 1000-4. Graphical user interface 1000 can also include controls 1000-5 for a user to set a deadline for the one or more uploaded questionnaire files by which they need to be submitted. As shown in FIG. 1A, graphical user interface 1000 includes a toggle switch 1000-6 for utilizing DAWN™, which is a name for the one or more example implementations of the present disclosure ("Use Dawn" toggle switch 1000-6 indicated by a bold arrow in FIG. 1A). Once the switch is toggled, graphical user interface 1005 illustrated in FIG. 1B is displayed.

Continuing with reference to FIG. 1B, graphical user interface 1005 further includes a selection menu 1005-1 for selecting a knowledge base and a toggle switch 1005-2 for triggering a process to populate responses to the questions included in the uploaded questionnaire file(s) ("Pre-populate Answers" toggle switch 1005-2 indicated by a bold arrow in FIG. 1B). Again, the knowledge base can be defined according to an account (e.g., user, customer, standard or department account) (e.g., 1000-3), a product (e.g., 1000-4), a specific customer organization, departments, groups, and the like.

FIG. 1C illustrates graphical user interface 1010 that is a partial section of graphical user interface 1005 with a toggled dropdown selection menu 1010-1 for selecting a knowledge base. As illustrated in FIG. 1C, a knowledge base associated with one or more accounts (user, customer, standard or department accounts) (e.g. 1010-2) or a whole organization (e.g., 1010-3) can be selected. In one or more example implementations, knowledge bases can be in mutually exclusive or group-subgroup relationships. For example, account-based knowledge bases can be mutually exclusive from one another, where responses stored in one knowledge base do not affect populated responses for questionnaires using another knowledge base. As another example, a whole organization knowledge base can have group-subgroup relationships with, and include all, of the account-based knowledge bases within the organization. Once a user selects a knowledge base and toggles the "Pre-populate Answers" switch 1005-2 shown in FIG. 1B, responses to the questions included in the uploaded questionnaire file(s) are populated based on past approved responses in the selected knowledge base.

Figure 1D:
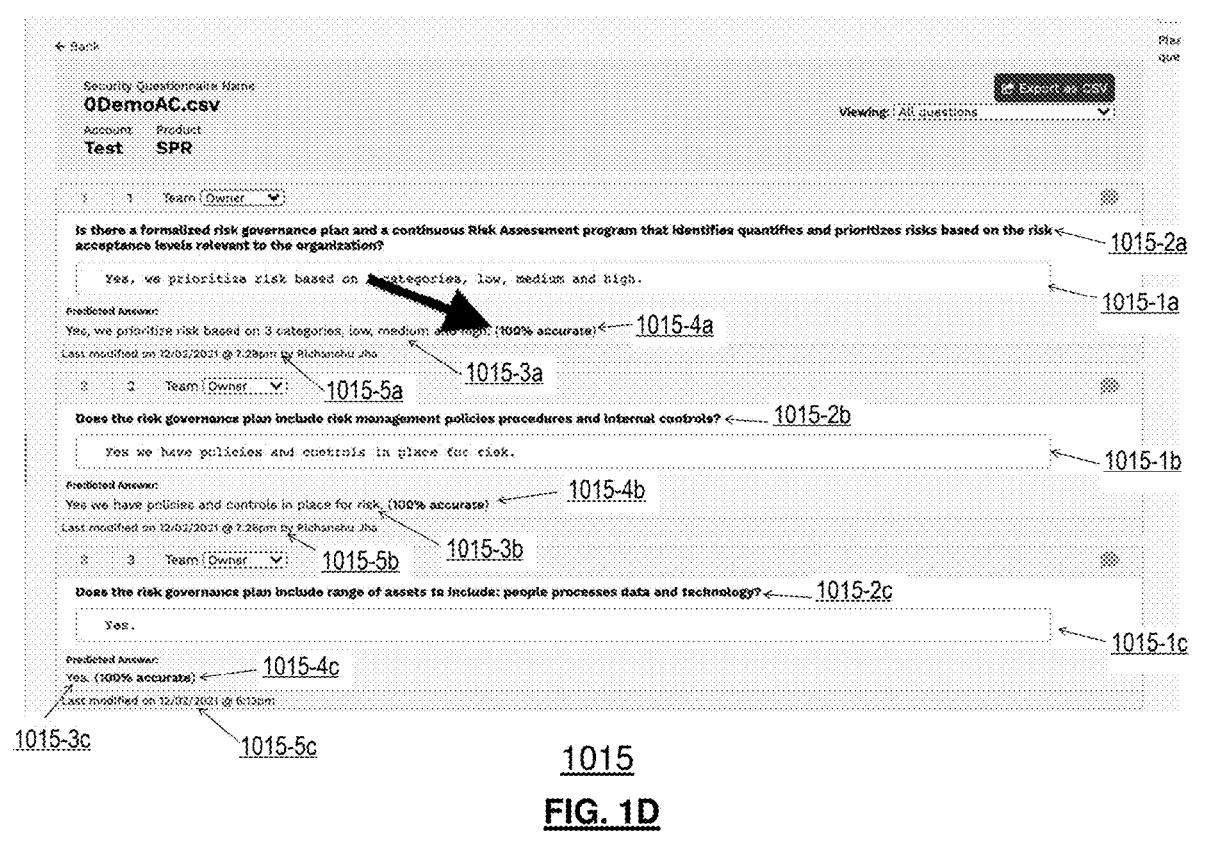

FIG. 1D illustrates graphical user interface 1015 according to one or more example implementations of the present disclosure. As shown in FIG. 1D, graphical user interface 1015 includes displays of populated responses 1015-1a, 1015-1b, and 1015-1c to questions 1015-2a, 1015-2b, and 1015-2c in an uploaded questionnaire. For each populated response, a predicted response 1015-3a, 1015-3b, and 1015-3c from the selected knowledge base is also displayed along with an accuracy indicator 1015-4a, 1015-4b, and 1015-4c, as well as an indication 1015-5a, 1015-5b, and 1015-5c of when the past response that forms the basis for the predicted response was "last modified." If a question in the uploaded questionnaire is identical to a previous question stored in the selected knowledge base (see step s401 in FIG. 4), the accuracy indicator of "100%" is displayed for the predicted response. If, however, the populated response corresponds to a question in the selected knowledge base that is not an exact match but exceeds a similarity threshold (see step s415 in FIG. 4), the displayed accuracy percentage would be changed to indicate a non-100% accuracy for the predicted response that was used to populate the questionnaire (see step s420 in FIG. 4). A user is provided with the ability to edit, reject or confirm the populated responses. Thus, an approved, rejected or edited response is used to continuously train the selected knowledge base for improving subsequent predicted and populated responses to future questions in future uploaded questionnaires. Moreover, an approved, rejected, or edited response can be used to update records, such as to remove previous answers automatically that would otherwise be stale.

Figure 1E:
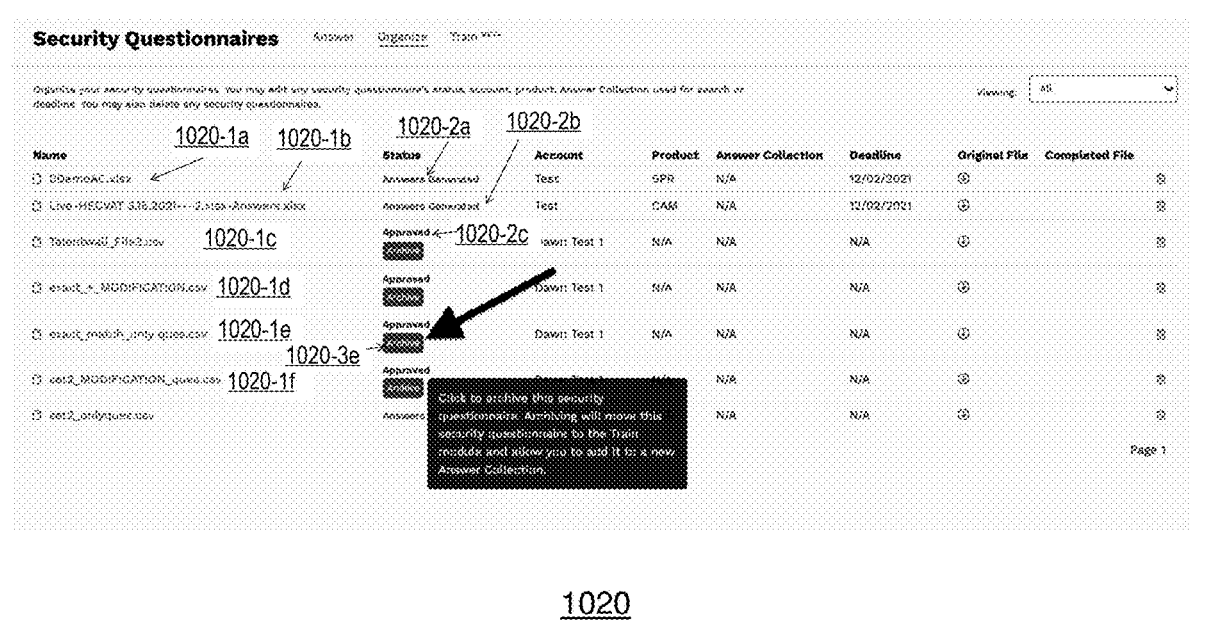

FIG. 1E shows graphical user interface 1020 that displays multiple uploaded questionnaire files 1020-1a and 1020-1b with populated responses generated ("answers generated") 1020-2a and 1020-2b awaiting a user's review and approval, along with questionnaire files 1020-1c, 1020-1d, 1020-1e, 1020-f, and 1020-1g with populated responses that have been reviewed (and, if needed, edited) and "[a]pproved." (e.g., 1020-2c) As illustrated in FIG. 1E and according to one or more example implementations, an "archive" button (e.g., 1020-3e) is provided for each approved questionnaire to allow a user to selectively incorporate the approved responses to the uploaded questionnaires to respective knowledge bases. In other words, the process of the present disclosure provides a user with a selection on how the knowledge base is trained.

FIG. 1F illustrates a graphical user interface 1025 that provides a user with a selection of uploaded questionnaires containing approved responses for training a knowledge base. Graphical user interface 1025 corresponds to steps s215 and/or s320 described below in one or more example implementations of the present disclosure. As illustrated in FIG. 1F, a user is provided with an interface for training a questionnaire knowledge base by uploading one or more questionnaire files (e.g., 1025-1a, 1025-1b, 1025-1c) that contain approved responses. Based on the uploaded approved responses, the questionnaire knowledge base provides for pre-populating responses to related questions in future questionnaires. As illustrated in FIG. 1F, the user is further provided with an interface for defining a response collection 1025-2 for grouping the responses contained in the uploaded one or more questionnaire files together in a collection for later retrieval and review. Response collections can be organized in any manner chosen by the user, such as responses to questions to a particular department, organization, questions from a specific organization (such as a specific customer), questions on security protocols, HR, technical standards, operational statistics, to name a few. As further illustrated in FIG. 1F, uploaded questionnaire files are associated 1025-3, collectively or individually, to a specific account (e.g., a user, customer, standard or department account), a product, or "company-wide" (e.g., a whole organization).

Figure 1G:
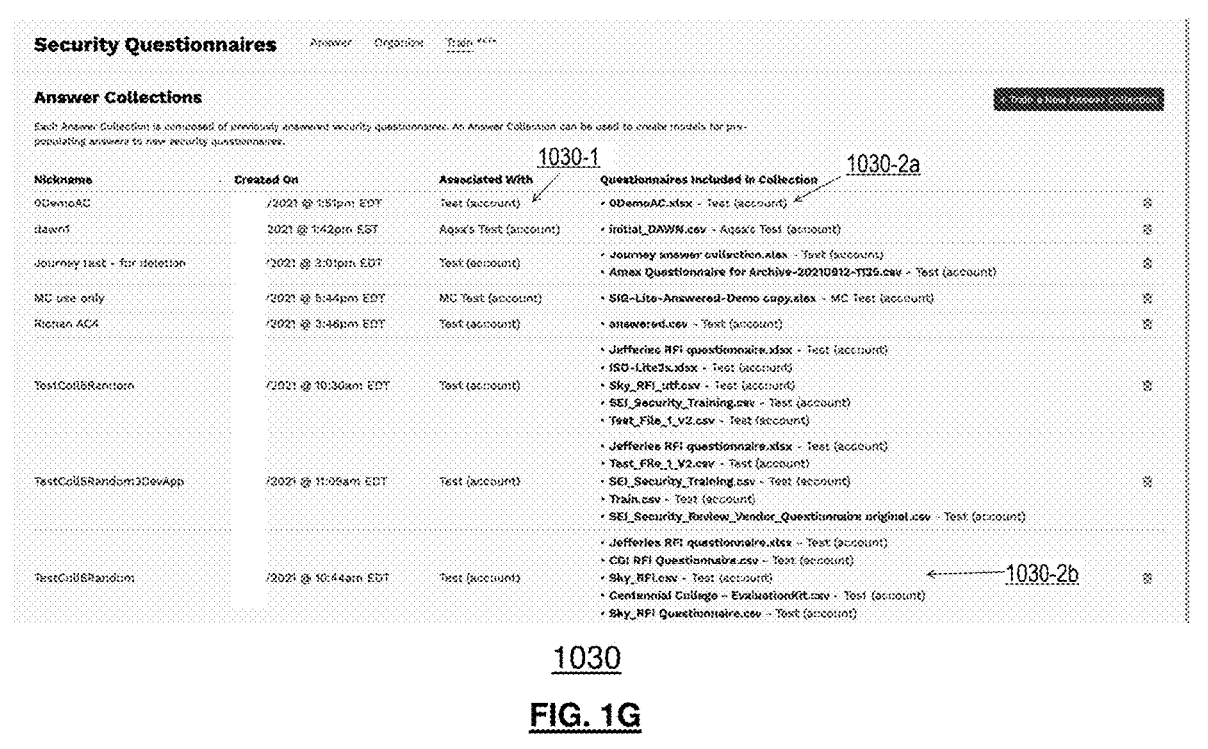

FIG. 1G shows a graphical user interface 1030 that includes archived questionnaires with approved responses that are organized by account associations ("Associated With") (e.g., 1030-1) and knowledge base "Collections." (e.g., 1030-2a and 1030-2b). Thus, as shown in FIG. 1G, knowledge bases can be trained based on account associations and/or collections that are defined under each account association. For example, a user of an account (e.g., 1030-1) can define multiple collections (e.g., 1030-2a and 1030-2b) that form respective knowledge bases within the account association. Accordingly, the respective collection knowledge bases, for example, collectively form a knowledge base for the associated account and all knowledge bases associated with all accounts within an organization forms a knowledge base for the organization as a whole.

Figure 1H:
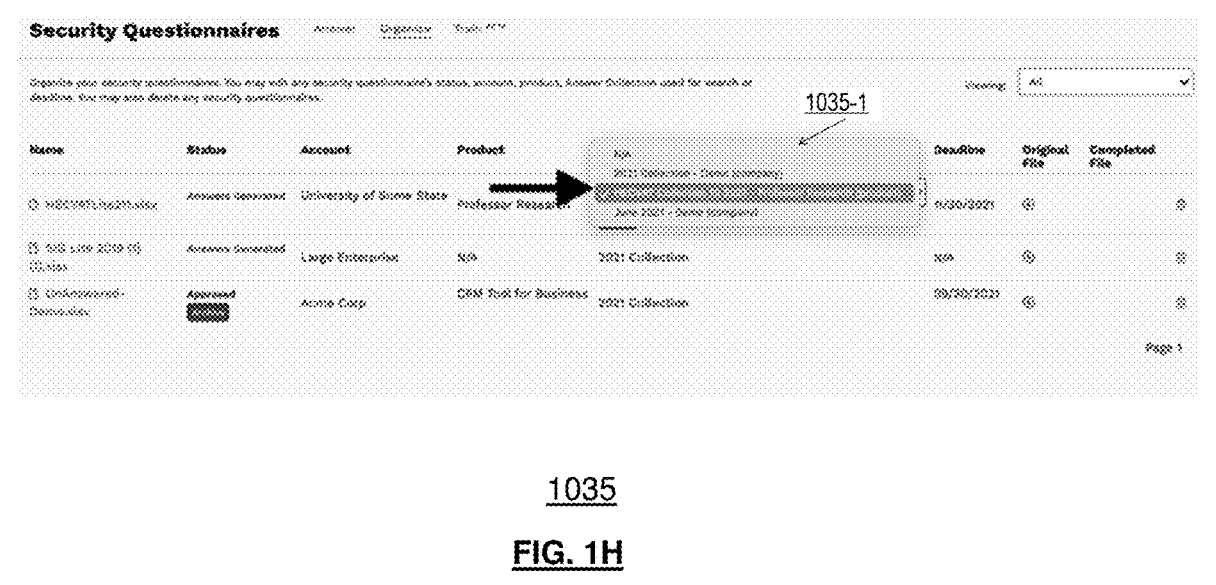
Figure 1I:
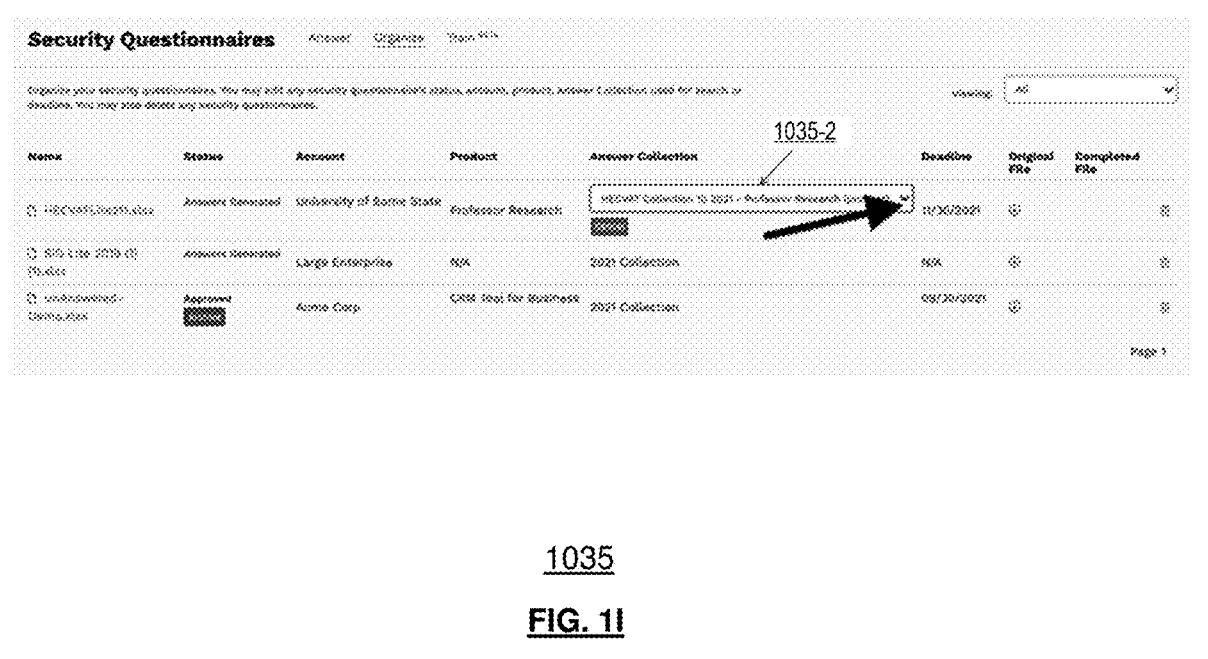

Referring to FIG. 1H shows a graphical user interface 1035 that includes options for organizing a questionnaire, including to associate responses to the questionnaire with one or more respective collections for purposes of searching through other available answers in a collection. In the example shown in FIG. 1H, a drop-down list 1035-1 of answer collections associated with a respective questionnaire is shown, with one record selected. FIG. 1I illustrates the selection 1035-2 completed.

Figure 1J:
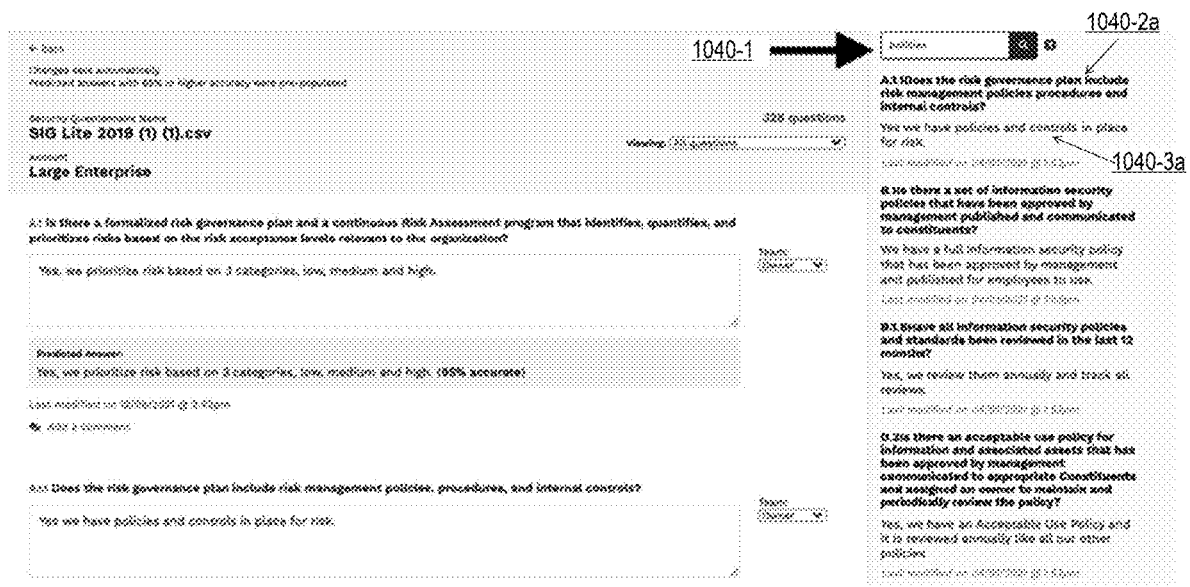

The present disclosure further supports providing in a graphical user interface specific previous questions and corresponding responses that are stored in the knowledge base. For example, and as illustrated in the example graphical user interface 1040 shown in FIG. 1J, a textbox 1040-1 can be included in the GUI for a user to submit a term or terms to be searched. Once submitted, one or more computing devices can execute instructions to process the term(s) and identify questions (e.g., 1040-2a) or answers (e.g., 1040-3a) from previously processed questionnaires that contain the same term or similar terms. The identified questions can, thereafter, be displayed in the GUI along with corresponding responses to the identified questions. In this way, information can be provided to users to assist with responding to questionnaires, including by providing responses to previous questions that match one or more search terms submitted by the user but may not have pre-populated automatically during the earlier process.

Advantageously, the present disclosure provides a streamlined process for managing large volumes of approved responses and their related questions in past questionnaires and for utilizing knowledge bases from such past questionnaires to efficiently handle new questionnaires and related questions. Additionally, the present disclosure provides user control over the training of knowledge bases for pre-populating questionnaire responses so that context integrity and accuracy is maintained among the knowledge bases.

Figure 1K:
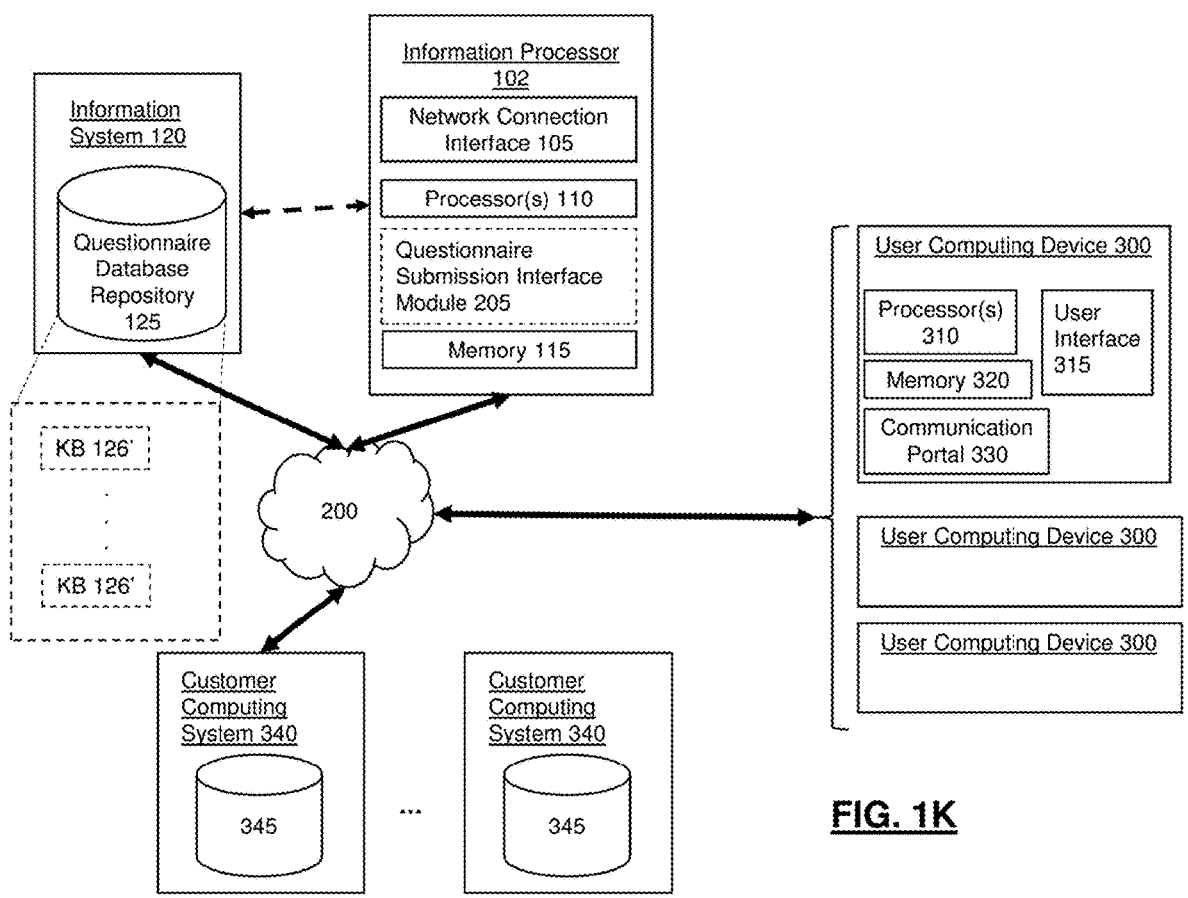
FIG. 1K is a schematic diagram of a system for one or more example implementations of the present disclosure.

FIG. 1K shows, according to one or more example implementations, an information processor 102 for maintaining a questionnaire database repository 125 at information system 120 and for pre-populating prospective questionnaire responses for user computing devices 300 according to one or more example implementations of the present disclosure.

As shown in FIG. 1K, information processor 102 includes a network connection interface 105, one or more processor(s) 110, and memory 115.

Network connection interface 105 is communicatively connected to network 200 and can include any circuitry allowing or enabling one or more components of information processor 102 to communicate with one another, with user computing device 300, and/or with one or more additional devices, servers, and/or systems—for example, information system 120—using any number of communications protocols through network 200.

According to one or more example implementations, network 200 is at least partially comprised of the Internet that can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"). Various additional communication protocols can be used to facilitate communications between user computing device 300 and information processor 102, including the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, and/or SSH. In embodiments, network 200 can comprise an intranet network, a local area network, other wireless or other hardwired connection or connections, or a combination of one or more thereof, by which individual components of the system illustrated in FIG. 1K can communicate. Communications systems for facilitating network 200 can include hardware (e.g., hardware for wired and/or wireless connections) and/or software. In embodiments, communications systems can include one or more communications chipsets, such as a GSM chipset, CDMA chipset, LTE chipset, 4G/5G, Wi-Fi chipset, Bluetooth chipset, to name a few, and/or combinations thereof. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections can be provided through telephone ports, Ethernet ports, USB ports, and/or other data ports, such as Apple 30-pin connector ports or Apple Lightning connector ports, to name a few. Wireless connections can include cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network 5, such as the Internet, a telephone network, a mobile broadband network (such as a cellular data network), a mesh network, Wi-Fi, WAP, LAN, and/or WAN, to name a few.

One or more processor(s) 110 comprises a central processing unit (CPU) of information processor 102 and can include any suitable processing circuitry capable of controlling operations and functionality of information processor 102 as well as facilitating communications between various components within information processor 102. In embodiments, processor(s) 110 can include a graphic processing unit ("GPU"), one or more microprocessors, a digital signal processor, or any other type of processor, or any combination thereof. In some embodiments, the functionality of processor(s) 110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 110 can include its own local memory, which may store program systems, program data, and/or one or more operating systems.

Memory 115 includes memory storage systems for storing program instructions that are executed by processor(s) 110 to perform the process features as described in further detail below in accordance with one or more example implementations of the present disclosure. Memory 115 can incorporate one or more types of storage mediums such as any volatile or non-volatile memory, or any removable or non-removable memory implemented in any suitable manner to store data for information processor 102. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 115 can be implemented as computer-readable storage media ("CRSM"), which can be any available physical media accessible by processor(s) 110 to execute one or more instructions stored within memory 115.

In one or more example implementations and as described above, one or more questionnaire files can be provided to information processor 102 from one or more of user computing devices 300 via a questionnaire submission interface module 205. The module 205 can be provided via HTTP through network 200 and with which the one or more of user computing devices 300 can communicate using an application, such as a web browser, a mobile app, a web form, or other suitable means. In one or more implementations, questionnaire submission interface module 205 provides one or more webpages (such as graphical user interfaces 1000-1030 illustrated in FIGS. 1A-1G) at a particular URL, which allows users at user computing devices 300 to upload one or more questionnaire files (400). The questionnaire files (400) can be received from one or more of customer computing systems 340 associated with organizations that implement policies related to the questionnaire files (400). The questionnaire files (400) include a plurality of questions that are, for example, related to an operation associated with the one or more user computing devices 300. In one example implementation, each questionnaire file (400) embodies one or more input forms that respectively contain one or more questions, each having a word string that embodies an input field label representing data stored and/or associated with a corresponding response to the question. The data stored and/or associated with the corresponding response embodies an input field.

In one or more example implementations, information processor 102 automatically populates responses to the questions in the questionnaire files (400). Responses can be populated based on prior approved responses to related questions that are stored in questionnaire database repository 125 at information system 120. Similarities between the questions in the questionnaire file (400) and the related questions stored at information system 120 are determined using a recognition process that includes a semantic-based machine learning (ML) model for recognizing semantic relationships among words strings that form the questions. Thus, past approved responses to questions that are similar but not identical to a question in a questionnaire file (400) can be utilized to populate the questionnaire file (400), thereby improving the utilization of the knowledge base formed by the past approved responses.

FIG. 1K illustrates the structure of user computing device 300, which is representative of the basic structure for all user computing devices 300. It can be appreciated by one of ordinary skill in the art that user computing devices 300 can include workstations, terminals, personal computers, networked smart appliances and devices (such as image scanners for scanning hardcopy questionnaire documents), and/or mobile devices, such as cellphones, tablet computers, portable media devices with user interfaces, and the like, with Internet access that are uniquely identifiable by Internet Protocol (IP) addresses, Internet cookies, Media Access Control (MAC) identifiers, or online personal accounts of the individual users associated with the computer devices 300, either directly or through another user computing device.

As illustrated in FIG. 1K, each user computing device 300 includes one or more processor(s) 310, a user interface 315, a memory 320, and a communication portal 330.

Processor(s) 310 includes the CPU for user computing device 300, which executes an operating system ("OS") for user computing device 300, and/or one or more firmware applications, web applications, and/or applications resident thereon. According to one or more example implementations, processor(s) 310 executes a local client script for reading and rendering content received from questionnaire submission interface module 205. For example, processor(s) 310 can run a local JavaScript client for rendering HTML (HyperText Markup Language) or XHTML (Extensible HyperText Markup Language) content received from a particular URL accessed by user computing device 300, such as questionnaire submission interface module 205 maintained by information processor 102. Example implements of processor(s) 310 can include those described above with respect to processor(s) 110.

User interface 315 is operatively connected to processor(s) 310 and can include one or more input or output device(s), such as switch(es), button(s), key(s), a keyboard, a mouse, a touch screen, a display, microphone, camera(s), sensor(s), etc., as would be understood in the art of electronic computing devices.

Example implements of memory 320 can include those described above with respect to memory 115.

Example implements of communication portal 330 can include those described above with respect to network connection interface 105 for communicating with other apparatuses and devices through network 200 using the previously mentioned exemplary communications protocols. In some embodiments, user computing device 300 can include one or more antennas to facilitate wireless communications with a network using various wireless technologies (e.g., Wi-Fi, Bluetooth, radiofrequency, etc.). In yet another embodiment, user computing device 300 can include one or more universal serial bus ("USB") ports, one or more Ethernet or broadband ports, and/or any other type of hardwire access port so that communications portal 330 allows user computing device 300 to communicate with one another or with one or more communications networks, including network 200.

According to one or more example implementations of the present disclosure, information processor 102 is in communication with information system 120 via direct connection and/or via network 200. As illustrated in FIG. 1K, information system 120 maintains questionnaire database repository 125, which includes at least a portion of all past finalized and submitted questionnaire files associated with user computing devices 300. As further illustrated in FIG. 1K, the past finalized questionnaire files with approved/edited responses are organized by knowledge bases 126' in questionnaire database repository 125. Knowledge bases ("KB") 126' correspond to the knowledge bases described above with reference to FIGS. 1A-1G, which can include user-defined response collections that form respective knowledge bases, account-associated knowledge bases, organization-wide knowledge bases, and the like. For example, KB 126' can be organized based on associations to user groups, such as those included in corporate operating organizations, departments, and the like. Users associated with and/or of the user computing devices 300 can each be associated with a personal user profile account. In embodiments, one or more personal user profile account(s) can be maintained at information processor 102 and/or information system 120. Thus, past questionnaire submissions and approved responses in respective KB 125' are accessed by information processor 102 for associating questions in a current questionnaire file (400) to related past questions to generate predicted responses for at least some of the questions in the current questionnaire file (400). According to one or more example implementations, information system 120 maintains a KB 125' for each organization (user group) for generating relevant predicted and populated responses to questionnaires for the respective organizations (user groups).

As illustrated in FIG. 1K, customer computing systems 340 that maintain respective data storage systems 345 are also in communication with information processor 102 and user computing devices 300 via network 200. Customer computing systems 340 incorporate computer apparatuses example implementations of which can conform to those described above with respect to information processor 102 and user computing devices 300. Their respective data storage systems 345, likewise, incorporate memory and information systems exemplary implementations of which can conform to those described above with respect to information system 120 and memory 115. Customer computing systems 340 represent systems of organizations that issue questionnaires to users of user computing devices 300 to which the process of the present disclosure provides predicted and populated response. As an example, an organization associated with a user group is seeking to initiate or maintain a relationship with an organization represented by one of customer computing systems 340. As a condition for the relationship, customer computing system 340 issues a questionnaire—say, an operation security questionnaire—for meeting minimum threshold requirements for establishing or maintaining the relationship with the organization represented by customer computing system 340. For large organizations with multiple independent departments—for example, sales, information technology (IT), research and development, material procurement, operations, networking, and the like—harmonizing and meeting the response requirements for large numbers of such questionnaires poses a longstanding challenge to such organizations. Accordingly, the process of the present disclosure addresses the long felt need for a computer network implemented process to efficiently and accurately process such questionnaires across large user groups and subgroups with reduced user intervention for fulfilling the questionnaire requirements.

Figure 2:
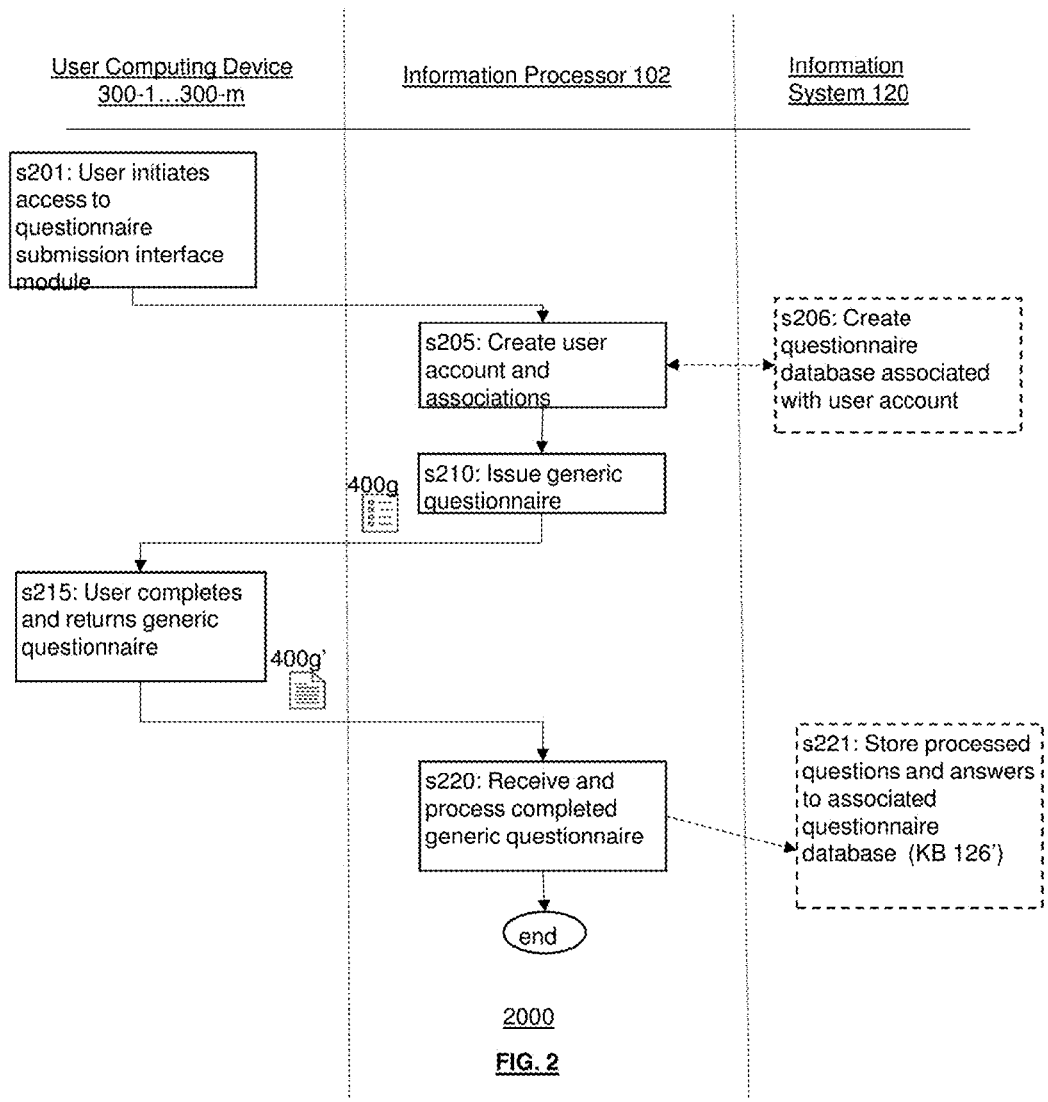
FIG. 2 is a flow diagram of an initialization process according to one or more example implementations of the present disclosure.

FIG. 2 illustrates an initialization process 2000 for saving initial basic information corresponding to a user group at information system 120 and subsequently generating usable predicted and populated responses to questions in questionnaire files received from one or more of customer computing systems 340.

As shown in FIG. 2, process 2000 initiates with step s201 where a new user at user computing devices 300 accesses questionnaire submission interface module 205 at information processor 102. The user is prompted to associate to a predetermined account or user group so that a database of questionnaire responses (one or more KB 126') is created and/or maintained by information processor 102 at information system 120, as illustrated by steps s205 and s206 in FIG. 2. According to one or more example implementations, an organization account is created for relating plural individual user accounts to the organization account. Once a user account and its associations are established, information processor 102 issues a questionnaire 400g incorporating basic questions, such as basic security operation questions and the like, to the user at one of user computing devices 300, as illustrated by step s210 in FIG. 2. According to one or more example implementations, generic questionnaire 400g embodies a file incorporating plural question word strings that correspond to respective plural response input fields.

Next, at step s215, the user at one of user computing devices 300 completes by responding to the questions included in the generic questionnaire 400g and transmits the completed questionnaire 400g' to information processor 102. According to one or more example implementations, the generic questionnaire 400g is rendered at one or more of user computing devices 300 on user interface 315, such as a display (not shown), where response input fields are displayed in correspondence with respective question word strings. The user can, then, input responses to the response input fields using user interface 315, such as a keyboard, touchscreen, and the like, and the inputted responses are saved to the file embodied by completed questionnaire 400g', which is transmitted to information processor 102. According to one or more example implementations, the inputted responses are saved to the completed generic questionnaire file 400g', which can conform to the .csv (Comma-Separated Values) or .xlsx (Microsoft Excel) file formats. In embodiments, other data file formats can be used—for example, xml (Extensible Markup Language) and the like.

At step s220, the completed generic questionnaire 400g' is received by information processor 102 from the user at one of user computing devices 300 and the question word strings and responses inputted by the user are processed and stored by information processor 102 to establish one or more databases (or knowledge base(s) KB 126') in information system 120, as shown by step s221 in FIG. 2. Initialization process 2000 is thereby completed and proceeds immediately to a first run of questionnaire process 3000.

After a completion of initialization process 2000, one or more of user computing devices 300 are provided with a test questionnaire file with blank (or no) response input fields to conduct a first run of questionnaire process 3000. Questionnaire process 3000 receives questionnaire files with blank or no responses and returns predicted and populated responses to questions in updated questionnaire files for a user's confirmation or edits. The confirmation(s) and/or edit(s) confirm and improve the questionnaire database(s) (one or more KB 126' in repository 125) maintained at information system 120. Thereafter, questionnaire files with blank or no responses received from customer computing systems 340 (e.g., "live" questionnaires) are uploaded by users at user computing devices 300 in the same manner via questionnaire process 3000 to generate predicted and populated responses for those questionnaires, confirm and edit the populated responses, and continuously update and improve the questionnaire database repository 125 (one or more KB 126') maintained at information system 120.

According to one or more example implementations, questionnaire process 3000 is a process for receiving questionnaires—e.g., data files that include questions received from customer computing systems 340 by information processor 102 from one or more of user computing devices 300. Questionnaire process 3000 further provides for information processor 102 returning predicted and populated responses to questions in updated questionnaire files to one or more of the same or different user computing devices 300. The predicted and populated responses are provided for display at the same or different user computing devices 300 for user confirmations and/or edits. As described above, process 3000 is provided via questionnaire submission interface module 205 that is maintained at information processor 102. According to one or more example implementations, questionnaires with blank, or without, responses (e.g., questionnaire file 400b) and updated questionnaires incorporating predicted and populated responses based on previously processed questions (e.g., questionnaire file 400u) are exchanged among information processor 102 (with information system 120), user computing devices 300, and customer computing systems 340 in files that conform to the .csv or .xlsx file formats (or xml and the like). In embodiments, other data file formats can be used.

Figure 3:
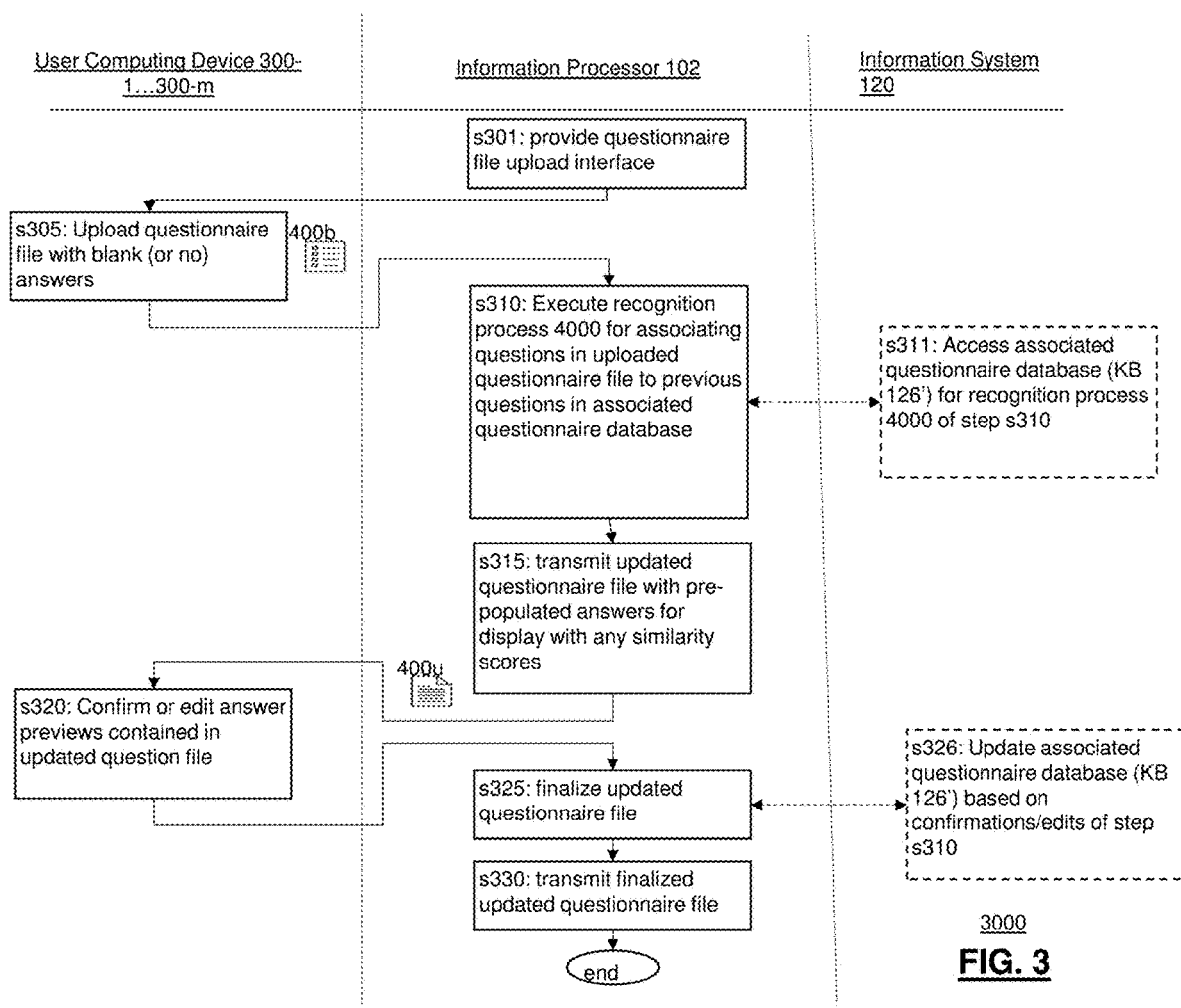
FIG. 3 is a flow diagram of a questionnaire process according to one or more example implementations of the present disclosure.

As shown in FIG. 3, questionnaire process 3000 initiates with questionnaire submission interface module 205 providing users at user computing devices 300 with an interface for uploading one or more questionnaire files, as illustrated by step s301. The one or more questionnaire files may or may not include answers. Next, at step s305, a questionnaire file with blank or no responses 400b is transmitted from one of user computing devices 300 to information processor 102. Graphical User Interfaces 1000-1010 described above with reference to FIGS. 1A-1C are example implementations of process steps s301 and s305.

For a first run of process 3000 after completing initialization process 2000, a test questionnaire file with same and/or different questions than those in generic questionnaire 400g is transmitted as questionnaire file 400b. Thereafter, any "live" or test questionnaire files with blank or no responses that are generated at information processor 102, information system 120, user computing device(s) 300, or customer computing system(s) 340 can be uploaded as questionnaire file 400*b*. According to one or more example implementations, questionnaire file 400*b* includes the same and/or different question word strings as those stored at information system 120.

Next, at step s310, information processor 102 executes a recognition process 4000 for associating the question word strings in questionnaire file 400*b* with question word strings stored in information system 120. As shown by step s311 in FIG. 3, information processor 102 accesses the associated questionnaire database(s) (one or more KB 126') created at step s206 and populated at step s221 for associating question word strings contained in questionnaire file 400*b* to previous question word strings stored in information system 120. As an example, the selected knowledge base illustrated in FIG. 1C can correspond to the one or more KB 126' that contain the previous question word stings for recognizing the question word strings in questionnaire file 400*b*.

For a first run of process 3000 after completing process 2000, the stored question word strings can comprise those from generic questionnaire 400*g*.

FIG. 4 is a flowchart illustrating a recognition process 4000 according to one or more example implementations of the present disclosure. As shown in FIG. 4, recognition process 4000 initiates with step s401, where information processor 102 searches for an exact word string match between the questions included in an uploaded questionnaire file 400*b* and previous questions stored in the questionnaire database at information system 120 that is associated with user computing device(s) 300 and/or its organization—e.g., one or more knowledge bases (KB 126').

Next, at step s405, for any question from the uploaded questionnaire file 400*b* that is an exact match to a previous question stored at information system 120, information processor 102 writes a corresponding previous response from the questionnaire database(s) (KB 126') at information system 120 to a response input field in the uploaded questionnaire file 400*b* as a predicted and populated response to the recognized question.

Process 4000 then proceeds to step s410, where a deep learning semantic similarity model is executed for any remaining question word strings contained in the uploaded questionnaire file 400*b* for which an exact match is not found in information system 120 (or one or more KB 126').

According to one or more example implementations, the similarity model is trained on a large number of question word string and response pairs. Context based matching is used for determining similarities from question word strings in terms of context and word occurrence matching. Based on these determinations, the model assigns a numeric score that indicates the level of similarity between two questions—namely, a question included in the uploaded questionnaire file 400*b* and one of the questions stored at information system 120 (or one or more KB 126') that is determined to be sufficiently similar. Table 1 below lists raw score ranges, display scores, and their corresponding similarity characteristics as determined by a similarity model according to one or more example implementations of the present disclosure.

TABLE 1

| Raw Score | Display Score | Meaning |
| --- | --- | --- |
| 1 | 1 | the questions are an exact word for word match, pure copy and paste |

TABLE 1-continued

| Raw Score | Display Score | Meaning |
| --- | --- | --- |
| 0.9-0.99 | 0.95 | the questions are basically the same, only a slight wording difference between two questions |
| 0.8-0.9 | 0.85 | one or two key words missing |
| 0.7-0.79 | 0.75 | only two or more keywords matched |
| 0.6-0.69 | 0.65 | only one key word (or phrase) matched |

Although the scores in Table 1 represent matching based on gradations of key words, other kinds of matching can be used to generate scores and score ranges. For example, degrees of matching based on context and contextual analysis is supported.

As illustrated in Table 1 above, a similarity score of 1.0 indicates an exact match between the question word strings. According to one or more example implementations, previous responses stored in information system 120 that correspond to question word strings with similarity scores above the 0.6 threshold to any questions on the uploaded questionnaire file 400*b* are formatted and written to corresponding response input fields as predicted and populated responses in the uploaded questionnaire file 400*b*, as illustrated by step s415 in FIG. 4. Correspondingly, at step s420, the similarity scores that correspond to the responses written at step s415 are recorded at information processor 102 for display at user computing device 300 along with the written responses. The accuracy percentages shown on graphical user interface 1015 in FIG. 1D and described above are example implementations of the displayed similarity scores. Recognition process 4000 is then completed and an updated questionnaire file 400*u* incorporating the above-described written responses, which embody predicted and populated responses for the user at user computing device 300, is generated.

Referring back to FIG. 3, process 3000 next proceeds to step s315, where the updated questionnaire file 400*u* is transmitted to one or more of the same or different user computing devices 300, along with any similarity scores for responses that are formatted and written at steps s315 and s320, for rendered display at user computing device 300. Again, the accuracy percentages shown on graphical user interface 1015 in FIG. 1D and described above are example implementations of the displayed similarity scores.

Next, at step s320, a user(s) at user computing device(s) 300 confirms and/or edits the predicted and populated responses in the updated questionnaire file 400*u* that are generated by information processor 102. The confirmations and/or edits are transmitted back to information processor 102—either in another edited questionnaire file (not shown) or indicator messages reflecting such confirmations and/or edits—and process 3000 proceeds to step s325. Graphical user interfaces 1015 and 1020 shown in FIGS. 1D-1E and described above form an example implementation of steps s320.

At step s325, information processor 102 finalizes the updated questionnaire file 400*u* based on the confirmations and/or edits received from user computing device(s) 300 that are inputted at step s320. The confirmations and/or edits are incorporated to the associated questionnaire database (KB 126') for the user(s) of user computing device(s) 300 in questionnaire database repository 125 maintained at information system 120. According to one or more example implementations, the finalized questionnaire file is archived at information system 120. The associated questionnaire database(s) (KB 126') is thereby continually updated and improved based on updated responses to the same or similar questions included in various questionnaire files. For example, responses to a new version of an archived questionnaire can be predicted and populated using the archived questionnaire and augmented using updated and more recent responses to the same or similar questions from other archived questionnaires. In one or more example implementations, the questionnaire database(s) (KB 126') are maintained on a real time basis so that populated responses to uploaded questionnaire files are generated based on up to date information maintained at the questionnaire database(s) (KB 126').

Next, at step s330, the finalized update questionnaire file is transmitted to one or more of the user computing devices 300 that uploaded questionnaire file 400*b*, the customer computing system(s) 340 that generated the blank or incomplete questionnaire file 400*b*, or another apparatus associated with a user in a same or different user group for further processing. In one or more example implementations, questionnaire process 3000 can process a portion of a questionnaire based on a relevant knowledge base (KB 126') and the resulting finalized questionnaire file can be forwarded to another user computing device 300 for further processing of another portion of the questionnaire using, inter alia, process 3000 based on another one or more knowledge bases (KB 126') maintained at information system 120.

Advantageously, large numbers of questionnaire files with same or similar questions can be processed so that continually updated responses can be predicted and populated across similar questions in different questionnaires. These populated responses can be continually confirmed or edited by users to further improve subsequent populated responses.

According to one or more example implementations, the deep learning semantic similarity model that is execute at step s410 described above comprises a semantic search that converts all entries—e.g., previous question word strings—whether they be sentences, paragraphs, or documents—into a vector space. At search time, the query—e.g., question word string contained in blank or incomplete questionnaire file 400*b*—is embedded into the same vector space and the closest embeddings are found. The semantic overlaps between the query and the entries are indicated by, for example, the similarity scores shown in Table 1.

One or more example implementations of the general query model is illustrated in the following reference:

```
@inproceedings{reimers-2019-sentence-bert,
    title = "Sentence-BERT: Sentence Embeddings using Siamese BERT-Networks",
    author = "Reimers, Nils and Gurevych, Iryna",
    booktitle = "Proceedings of the 2019 Conference on Empirical Methods in Natural Language Proces
    month = "11",
    year = "2019",
    publisher = "Association for Computational Linguistics",
    url = https://arxiv.org/abs/1908.10084",
}
```

As described above, the deep learning semantic similarity model of step s410 is trained on a large quantity of data comprising semantic search pairs. According to one or more example implementations, the model comprises a symmetric semantic search.

Figure 5:
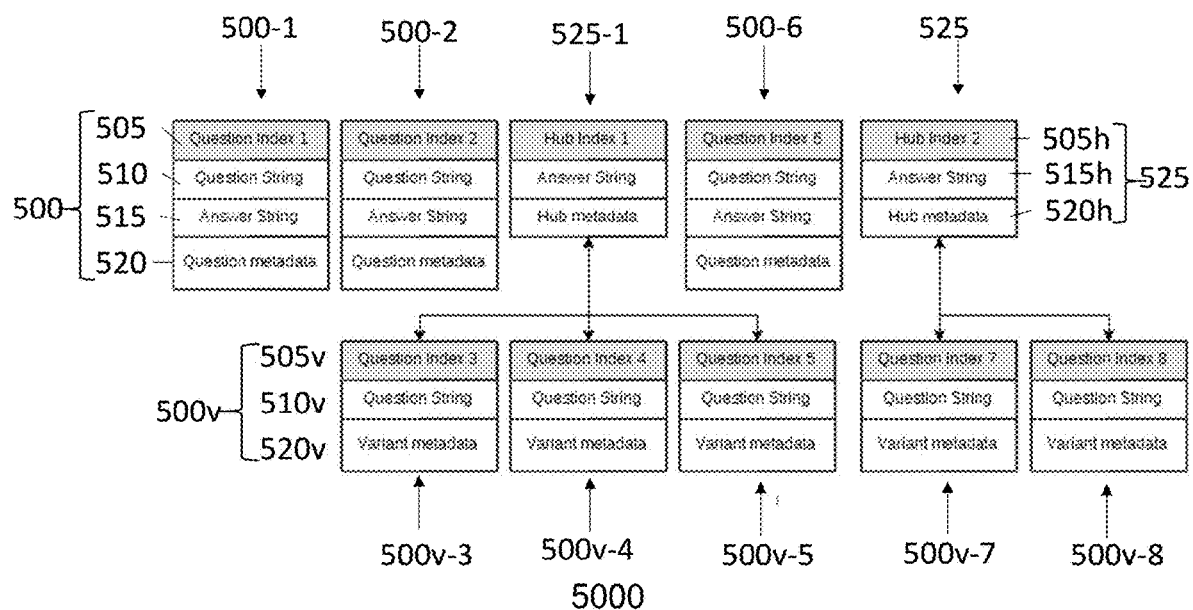
FIG. 5 is a diagram illustrating a data structure tree for a knowledgebase according to one or more example implementations of the present disclosure.

FIG. 5 illustrates an exemplary data structure 5000 for the question word strings and associated data that is stored in each knowledge base (KB 126') in questionnaire database repository 125 at information system 120. According to one or more example implementations, the question word string and response word string data is stored in a flat key-value database/data store and, as such, the database does not have a relational schema. As shown in FIG. 5, each unique question is assigned a question index 505 for identifying the associated unique question string 510 that comprises the word string of the question. A corresponding response string 515 is recorded from a confirmed questionnaire (such as generic questionnaire 400*g*' or finalized questionnaire from process 3000) from a user computing device 300. Additionally, question metadata 520, which can include keywords, tags, and the like, is stored with question index 505, question string 510, response string 515 to form a unique question record 500. FIG. 5 illustrates three generic unique question records 500-1, 500-2, and 500-6 having the aforementioned structure, which correspond to questions that are not associated with variations (Question 1, 2, and 6 in the diagram of FIG. 5). For these records, responses are stored along with their questions. Questions that have variations (termed as variants: Question 3, 4, 5 and 7, 8 shown in FIG. 5) are grouped as sets of variants each having a single Hub 525—Hub 1 and Hub 2 (525-1 and 525-2 in FIG. 5) for the aforementioned sets, respectively. A hub (525) can have many variants (500*v*-3, 500*v*-4, 500*v*-5, 500*v*-7, and 500*v*-8 in FIG. 5). However, according to one or more example implementations, each variant (500*v*) is only associated with one Hub (525). As illustrated in FIG. 5, each variant record 500*v* comprises a question index 505*v*, a question string 510*v*, and variant metadata 520*v*. Correspondingly, each hub record 525 comprises a hub index 505*h*, a response string 515*h*, and hub metadata 520*h*. As further shown in FIG. 5, variants 500*v*-3, 500*v*-4, and 500*v*-5 are linked to hub 525, and variants 500*v*-7 and 500*v*-8 are linked to hub 525. Thus, hub 525 incorporates related information on variants 500*v*-3, 500*v*-4, and 500*v*-5, as well as incorporates related information on variants 500*v*-7 and 500-8, According to one or more example implementations, the structure of the data can be described as a 1-2 depth N-ary tree forest, where each node is hash indexed; leaf nodes (variants 500*v*) contain the question string (510*v*) and root nodes (525) contain the response string (515*h*). According to one or more example implementations, child nodes (500*v*) have indexes of and, hence, access to their parent nodes (525) as well.

Each newly approved questionnaire is processed, and the relevant one or more knowledge bases (KB 126') in questionnaire database repository 125 is updated. This process includes the creation of questions, creation of new variants from existing questions, and changes in responses. Each question (500), hub (525), and variant (500*v*) are hash indexed and can be accessed in constant time regardless of the size of the database. Variants (500*v*) access their common response (515*h*) from their hub (525); a change in response (515*h*) for a set of variations (500*v*) involves updating the response (515*h*) in their singular hub (525). Hence, changes in responses to a large set of variants is also a constant time process.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed:

1. A system, comprising:
    a computing device configured to execute machine-readable instructions that, when executed by the computing device, cause the computing device to:
        access at least one database having a plurality of stored input forms and stored data, each of the stored input forms having a plurality of stored input fields and respectively corresponding input field labels, wherein the stored input field labels include word strings that represent at least some of the stored data respectively associated with the stored input fields;
        receive, from a user computing device, an input form having a plurality of input fields and respectively corresponding input field labels, wherein the input field labels include word strings that represent data to be respectively associated with the input fields;
        search for exact matches of the word strings in the input field labels with word strings in the stored input field labels to identify at least one exact matched stored input field label;
        for each of the at least one exact matched stored input field label, provide, to an updated input form, stored data respectively associated with the respective exact matched input field label;
        for each of the remaining input field labels:
            execute a deep learning semantic similarity model and identify a word string similarity score for the respective remaining input field label and a respective stored input field label;
            where the identified word string similarity score is above a threshold:
                provide, to the updated input form, stored data associated with the respective stored input field label; and
                display, to at least one computing device, the stored data associated with the respective stored input field label and the word string similarity score;
        transmit, to the user computing device, the updated input form including the stored data respectively associated with the respective exact matched input field label and the stored data associated with the respective stored input field label;
        receive, from the user computing device, at least one of a confirmation and an edit to the at least one updated input form;
        finalize the updated input form using the received at least one of the confirmation and the edit; and transmit, to at least one other computing device, the finalized updated input form.

2. The system of claim 1, wherein the at least one other computing device is operated by a user associated with issuing the received input form.

3. The system of claim 1, wherein the word strings included in the input field labels of the received input form relate to an operation associated with the user computing device.

4. The system of claim 1, wherein the deep learning semantic similarity model is previously executed on the stored input field labels and resulting data is saved to the at least one database.

5. The system of claim 4, wherein the executing of the deep learning semantic similarity model on the input field labels comprises retrieving the saved resulting data.

6. The system of claim 1, wherein the executing of the deep learning semantic similarity model on the input field labels occurs on the stored input field labels.

7. The system of claim 1, wherein the finalized updated input form is transmitted in a data file format selected from the group consisting of Comma-Separated Values and Extensible Markup Language.

8. The system of claim 1, wherein the updated input form is generated by populating the plurality of input fields of the received input form with the at least some of the stored data respectively associated with at least some of the stored input fields corresponding with the at least some of the stored input field labels.

9. The system of claim 1, wherein the computing device receives the input form and transmits the finalized updated input form over a data communication network via at least one network interface.

10. The system of claim 1, wherein the received input form contains a questionnaire related to an operation associated with the user computing device.

11. The system of claim 10, wherein the plurality of input fields relate to potential responses to respectively corresponding questions of the questionnaire contained in the respectively corresponding input field labels in the received input form.

12. The system of claim 1, wherein the associated at least some of the stored data respectively associated with at least some of the stored input fields corresponding with the at least some of the stored input field labels of the updated input form relates to a previous version of the received input form.

13. The system of claim 1, wherein the associated at least some of the stored data respectively associated with at least some of the stored input fields corresponding with the at least some of the stored input field labels of the updated input form relates to a different input form from the received input form.

14. The system of claim 1, wherein the computing device is further configured to update the at least one database using the received at least one of the confirmation and the edit.

15. The system of claim 1, wherein the word string recognition process comprises a semantic-based machine learning model for recognizing similar word strings to identify the one or more of the input field labels that correspond to the at least some of the stored input field labels.

16. A method, comprising:
accessing, by a computing device configured by executing machine-readable instructions, at least one database having a plurality of stored input forms and stored data, each of the stored input forms having a plurality of stored input fields and respectively corresponding input field labels, wherein the stored input field labels include word strings that represent at least some of the stored data respectively associated with the stored input fields;

receiving, by the computing device from a user computing device, an input form having a plurality of input fields and respectively corresponding input field labels, wherein the input field labels include word strings that represent data to be respectively associated with the input fields;

searching for exact matches of the word strings in the input field labels with the word strings in the stored input field labels to identify at least one exact matched stored input field label;

for each of the at least one exact matched stored input field label, providing, to an updated input form, stored data respectively associated with the respective exact matched input field label;

for each of the remaining input field labels:
executing a deep learning semantic similarity model and identifying a word string similarity score for the respective remaining input field label and a respective stored input field label;
where the identified word string similarity score is above a threshold:
providing, to the updated input form, stored data associated with the respective stored input field label; and
displaying, to at least one computing device, the stored data associated with the respective stored input field label and the word string similarity score;

transmitting, by the computing device to the user computing device, the updated input form including the stored data respectively associated with the respective exact matched input field label and the stored data associated with the respective stored input field label;

receiving, by the computing device from the user computing device, at least one of a confirmation and an edit to the at least one updated input form;

finalizing, by the computing device, the updated input form using the received at least one of the confirmation and the edit; and transmitting, by the computing device, to at least one other computing device, the finalized updated input form.

17. The method of claim 16, wherein the at least one other computing device is operated by a user associated with issuing the received input form.

18. The method of claim 16, wherein the word strings included in the input field labels of the received input form relate to an operation associated with the user computing device.

19. The method of claim 16, wherein the deep learning semantic similarity model is previously executed on the stored input field labels and resulting data is saved to the at least one database.

20. The method of claim 19, wherein the executing of the deep learning semantic similarity model on the input field labels comprises retrieving the saved resulting data.

* * * * *